(12) United States Patent
Little et al.

(10) Patent No.: US 8,213,799 B2
(45) Date of Patent: Jul. 3, 2012

(54) OPTICAL RECEIVER INCLUDING A FILTER ON A PLANAR LIGHTWAVE CIRCUIT

(75) Inventors: Brent E. Little, Glen Head, NY (US); Wei Chen, Ellicott City, MD (US); John V. Hryniewicz, Columbia, MD (US); Sai T. Chu, Columbia, MD (US); Jeff Rahn, Sunnyvale, CA (US); Mehrdad Ziari, Pleasanton, CA (US)

(73) Assignee: Infinera Corporation, Sunnyvale, CA (US)

( * ) Notice: Subject to any disclaimer, the term of this patent is extended or adjusted under 35 U.S.C. 154(b) by 600 days.

(21) Appl. No.: 12/345,824

(22) Filed: Dec. 30, 2008

(65) Prior Publication Data

US 2009/0245796 A1 Oct. 1, 2009

Related U.S. Application Data

(60) Provisional application No. 61/030,782, filed on Feb. 22, 2008.

(51) Int. Cl.
*H04J 14/02* (2006.01)
(52) U.S. Cl. ............................ 398/82; 398/212; 398/214
(58) Field of Classification Search .......... 398/205–214, 398/82
See application file for complete search history.

(56) References Cited

U.S. PATENT DOCUMENTS

| | | | |
|---|---|---|---|
| 5,504,827 A | | 4/1996 | Schimpe |
| 6,289,151 B1 * | | 9/2001 | Kazarinov et al. ............... 385/32 |
| 6,777,684 B1 * | | 8/2004 | Volkov et al. ............... 250/341.1 |
| 7,259,901 B2 | | 8/2007 | Parsons et al. |
| 7,394,953 B1 * | | 7/2008 | Nagarajan et al. ............... 385/37 |
| 2003/0002798 A1 | | 1/2003 | Hatayama et al. |
| 2004/0033004 A1 | | 2/2004 | Welch et al. |
| 2006/0165341 A1 * | | 7/2006 | Yan et al. ........................... 385/8 |
| 2006/0222296 A1 * | | 10/2006 | Suzuki et al. .................... 385/39 |
| 2008/0044131 A1 * | | 2/2008 | Yan et al. ......................... 385/16 |
| 2009/0148171 A1 * | | 6/2009 | Chen et al. ..................... 398/208 |

OTHER PUBLICATIONS

Pieper, Thomas, 'International Search Report,' Feb. 2009, European Patent Office, Rijswijk.
Pieper, Thomas, 'Written Opinion of the International Search Authority,' Feb. 2009, European Patent Office, Rijswijk.
Horne, M, et al., 'Air Force Highly Integrated photonic (HIP) Program,' Avionics Fiber-Optics and Photonics, IEEE Conference Annapolis, MD, USA, Sep. 2006, pp. 16-17, IEEE, Piscataway, New Jersey.
Mizuno, T., et al., 'Wideband Planar Lightwave Circuit Type Variable Optical Attenuator Using Phase-Generating Coupler,' Electronic Letters, May 2006, pp. 636-638, vol. 42, No. 11, IEE Stevenage, GB.
Kawachi, M., 'Recent Progress in Silica-based Planar Lightwave Circuits on Silicon,' IEEE Proceedings: Optoelectronics, Oct. 1996, pp. 257-262, vol. 143, No. 5, Institution of Electrical Engineers, Stevenage, GB.

* cited by examiner

*Primary Examiner* — Dzung Tran
(74) *Attorney, Agent, or Firm* — Duane Morris LLP; David L. Soltz

(57) ABSTRACT

A planar lightwave circuit (PLC) includes a substrate, a tunable filter, a demultiplexer (DEMUX), and an optical processor each disposed on the substrate. The tunable filter is configured to filter at least one of a bandwidth or a wavelength of a Wavelength Division Multiplexed (WDM) optical input signal. The DEMUX is connected to the tunable filter and configured to receive a filtered WDM optical input signal at an input and to supply one of a plurality of channels of the filtered WDM input signal at a respective one of a plurality of outputs. Each of the plurality of channels corresponds to one of a plurality of wavelengths of the filtered WDM input signal. The optical processor includes a bit-delay interferometer communicating with a respective one of the plurality of outputs of the DEMUX. The optical processor is configured to receive one of the plurality of channels from the DEMUX and output a plurality of demodulated optical signal components.

13 Claims, 5 Drawing Sheets

OPTICAL RECEIVER INCLUDING A FILTER ON A PLANAR LIGHTWAVE CIRCUIT

CROSS-REFERENCE TO RELATED APPLICATIONS

This application claims priority to U.S. Provisional Application No. 61/030,782 filed Feb. 22, 2008, which is herein incorporated by reference in its entirety.

FIELD

Embodiments of the invention relate to the field of optical communication devices. More particularly, the present invention relates to a transmitter used for optical communication systems implemented on a planar lightwave circuit (PLC).

BACKGROUND

Wavelength division multiplexed (WDM) optical communication systems are known in which multiple optical signals, each having a different wavelength, are combined onto a single optical fiber. Such systems typically include a laser associated with each wavelength, a modulator configured to modulate the output of the laser, and an optical combiner to combine each of the modulated outputs. Conventionally, WDM systems have been constructed from discrete components. For example, the lasers, modulators and combiners have been packaged separately and mounted on a printed circuit board. More recently, however, many WDM components including transmitters, receivers and passive devices have been integrated onto a single chip also referred to as a photonic integrated circuit (PIC).

Differential Quadrature Phase-Shift Keying (DQPSK) has been proposed as an optical signal modulation format capable of increasing the capacity of fiber optic communication systems. Demodulation of DQPSK signals or other signals transmitted in accordance with a self-coherent scheme require a considerable amount of optical and electrical circuitry. Conventional receiver implementations require several PLCs coupled together. Each PLC would include only one component of the optical receiver due to the size of the components. However, implementing an optical receiver requires tight tolerances to properly align the PLCs to avoid signal loss as the optical signals travel from one PLC to another. Additionally, implementing an optical receiver on several PLCs requires a large footprint for the optical circuit which not only requires the overall system to be larger, but also increases manufacturing costs. Accordingly, an improved optical receiver circuit is desirable.

SUMMARY

Exemplary embodiments of the present invention are directed to a high capacity optical receiver. In an exemplary embodiment a planar lightwave circuit (PLC) includes a substrate, a tunable filter, a demultiplexer (DEMUX), and an optical processor each disposed on the substrate. The tunable filter is configured to filter at least one of a bandwidth or a wavelength of a Wavelength Division Multiplexed (WDM) optical input signal. The DEMUX is connected to the tunable filter and configured to receive a filtered WDM optical input signal at an input and to supply one of a plurality of channels of the filtered WDM input signal at a respective one of a plurality of outputs. Each of the plurality of channels corresponds to one of a plurality of wavelengths of the filtered WDM input signal. The optical processor includes a bit-delay interferometer communicating with a respective one of the plurality of outputs of the demultiplexer. The optical processor is configured to receive one of the plurality of channels from the DEMUX and output a plurality of demodulated optical signal components.

In another embodiment, a planar lightwave circuit (PLC) includes a demultiplexer (DEMUX) and a plurality of tunable filters disposed on a substrate. The DEMUX is configured to receive a Wavelength Division Multiplexed (WDM) optical input signal at an input and to supply one of a plurality of channels of the WDM optical input signal at a respective one of a plurality of outputs Each of the plurality of channels corresponds to one of a plurality of wavelengths of the WDM optical input signal. Each of the tunable filters is coupled to a respective output of the DEMUX and configured to filter at least one of a bandwidth or a wavelength of the channels. The optical processor is configured to receive a filtered channel and output a demodulated optical signal component.

DETAILED DESCRIPTION

Figure 1:
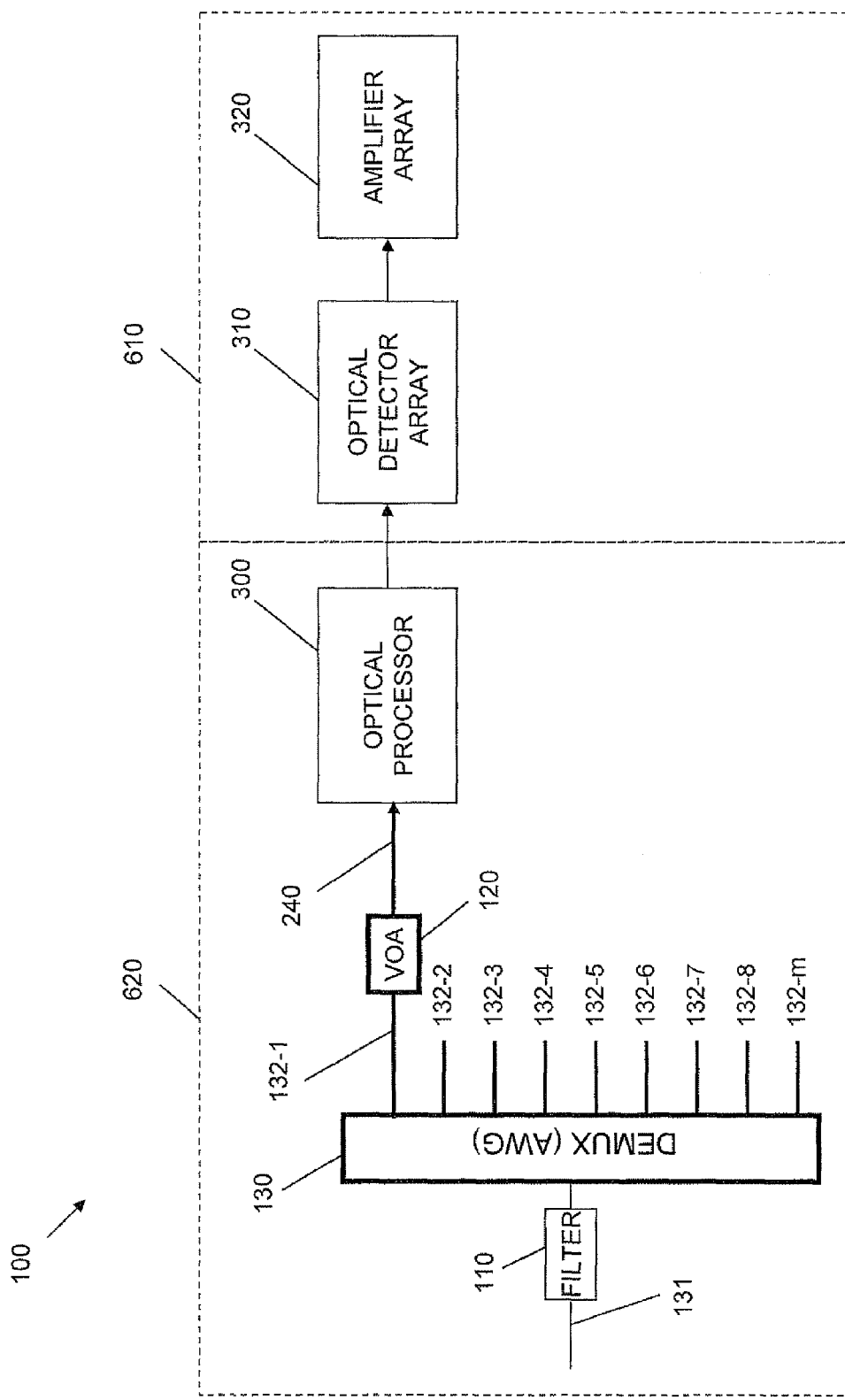
FIG. 1 illustrates exemplary components of an optical receiver in accordance with the present disclosure.

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. It will be understood that when an element or component is referred to herein as being "connected" or "coupled" to another element, it can be directly connected or coupled to the other element or intervening elements may be present therebetween. In contrast, when an element is referred to as being "directly connected" or "directly coupled" to another element, there are no intervening elements present. In the drawings, like numbers refer to like elements throughout.

FIG. 1 illustrates a block diagram of an optical receiver 100 configured to receive and process a DQPSK optical input signal in accordance with an aspect of the present disclosure. Optical receiver 100 includes a demultiplexer (DEMUX) 130 having an input 131 and a plurality of outputs 132-1 to 132-$m$ (hereinafter collectively referred to as "DEMUX outputs 132") formed on a first substrate 620. Bach of the DEMUX outputs 132 may be connected to an optical processor 300 through a tunable filter 110 and a variable optical attenuator 120 also formed on the first substrate 620.

Figure 1A:
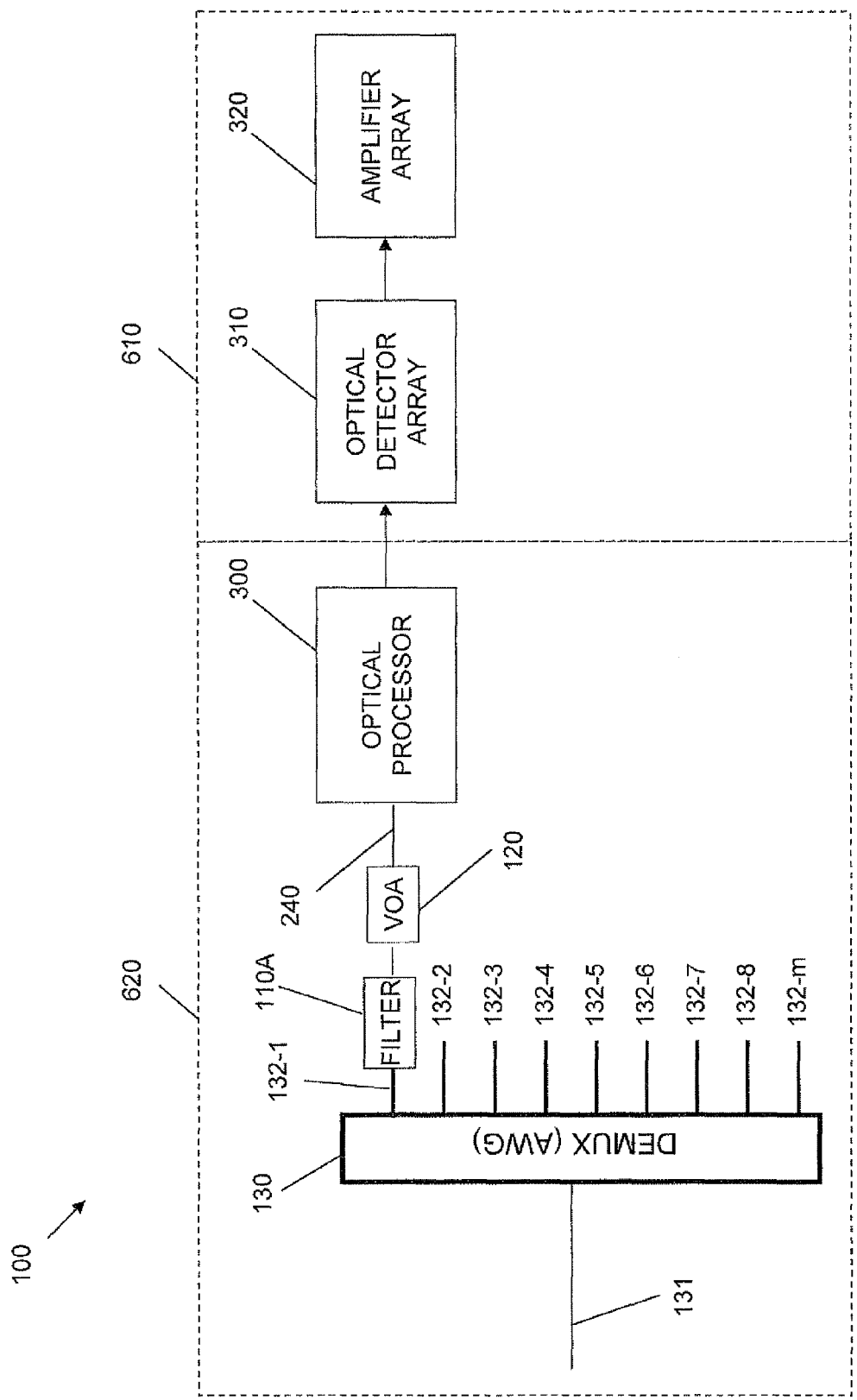
FIG. 1A illustrates exemplary components of an optical receiver in accordance with the present disclosure

The DEMUX 130 may be an arrayed waveguide grating (AWG) configured to receive a DQPSK WDM optical input signal at the input 131. DEMUX 130 may be configured to separate each of the channels of the WDM optical input signal and supply a corresponding channel at each of the DEMUX outputs 132. Each channel of the WDM optical input signal corresponds to one of the plurality of wavelengths of the WDM optical input signal. A tunable filter 110 may be coupled to the DEMUX input 131 as shown in FIG. 1. If coupled to the input 131 of the DEMUX 130, the tunable filter 110 may be a comb filter aligned to a standardized grid, such as an International Telecommunications Union (ITU) grid. However, a tunable filter 110A may be connected to each of the DEMUX outputs 132 as shown in FIG. 1A. If coupled to each of the DEMUX outputs 132, the tunable filter 110A is preferably tunable to a particular channel wavelength and/or a particular bandwidth (e.g., 10 GHz) associated with a corresponding one of the DEMUX outputs 132. Tunable filter 110A may have a narrow pass-band having a bandwidth between one half to two times the bandwidth of the WDM optical input signal. For example, if the WDM optical input signal has a bandwidth of 10 Hz, then the pass-band of the tunable filter 110A may be between 5 GHz and 20 GHz. One skilled in the art will understand that other pass-bands for tunable filters 110 may be implemented.

Figure 4:
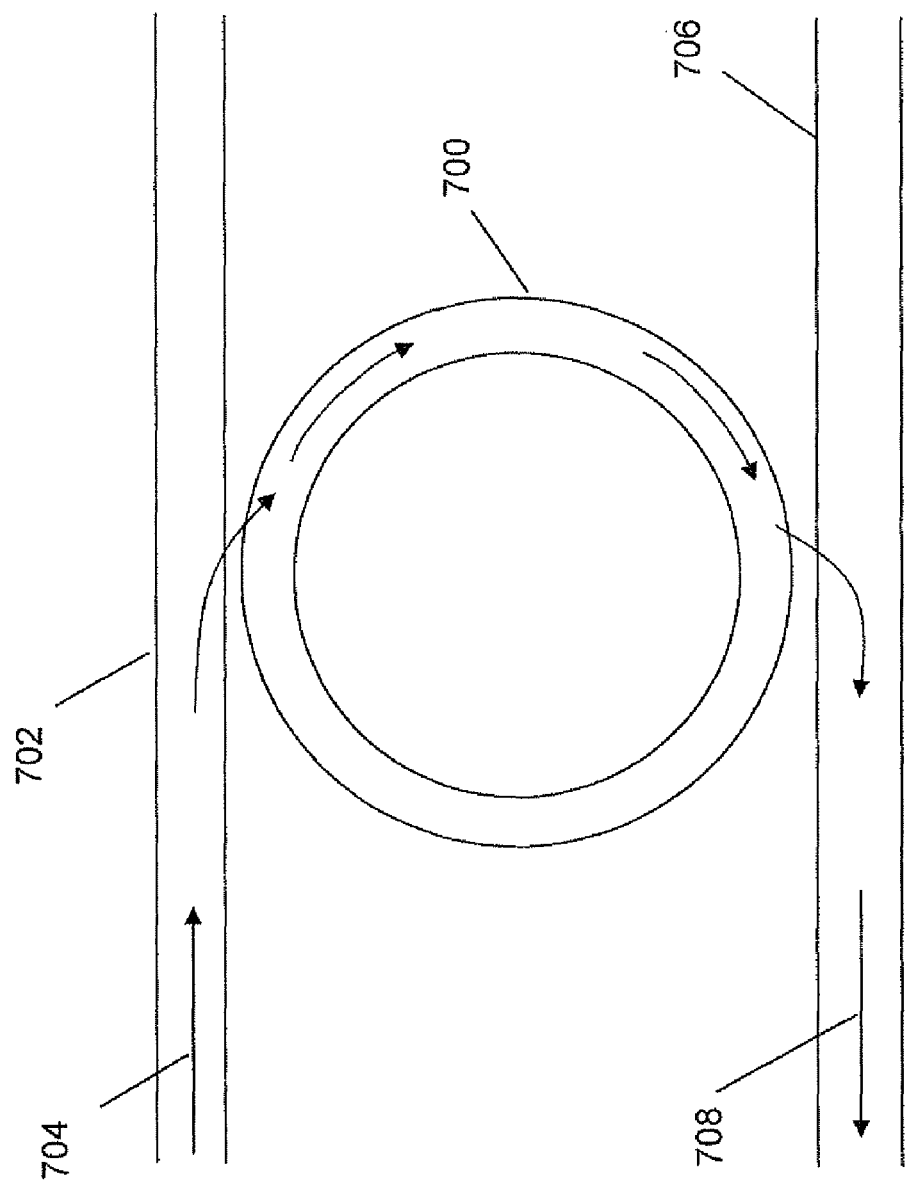
FIG. 4 illustrates the exemplary components of a ring resonator used to implement the tunable filter in accordance with FIG. 1.

Tunable filter 110A may be implemented using ring resonators. FIG. 4 illustrates one example of a ring resonator 700 which may be used to filter an optical signal 704. As shown in FIG. 4, ring resonator 700 is disposed adjacent to a first waveguide 702 that carries the incoming optical input signal 704. A second waveguide 706 that carries a filtered optical signal 708 is disposed on another side of ring resonator 700. The optical input signal 704 will travel along waveguide 702 and be evanescently coupled to the ring resonator 700. The physical dimensions of the ring resonator 700, such as the diameter and refractive index, acts to filter the incoming optical signal as various wavelengths of the optical signal will constructively and destructively interfere with one another. The filtered optical signal 708 is evanescently coupled into the second waveguide 706. Accordingly, tunable filter 110 may be implemented using a plurality of ring resonators 700 to filter the incoming optical signal to have the desired characteristics, e.g., wavelength(s).

As further shown in FIG. 1, a variable optical attenuator (VOA) 120 may also be coupled to each DEMUX output 132 to individually vary the intensity of each channel. Each optical channel of the DQPSK WDM input signal (optical signal 240) is fed to a corresponding optical processor 300. Alternatively, VOA 120 may be provided at the input 131 of DEMUX 130 to collectively adjust the intensity of the channels input to the DEMUX 130. VOA 120, whether positioned at the DEMUX outputs 132 or the input 131 of the DEMUX 131, can increase the dynamic range of receiver 100. VOA 120 may include a Mach-Zehnder interferometer having an input splitter, a pair of waveguide branches, and an output combiner. The waveguide branches may be configured as an interferometer where one of the waveguide branches has a thermo-optic heater which varies the phase of the waveguide branch and subsequently the attenuation at the output of the combiner.

Figure 2:
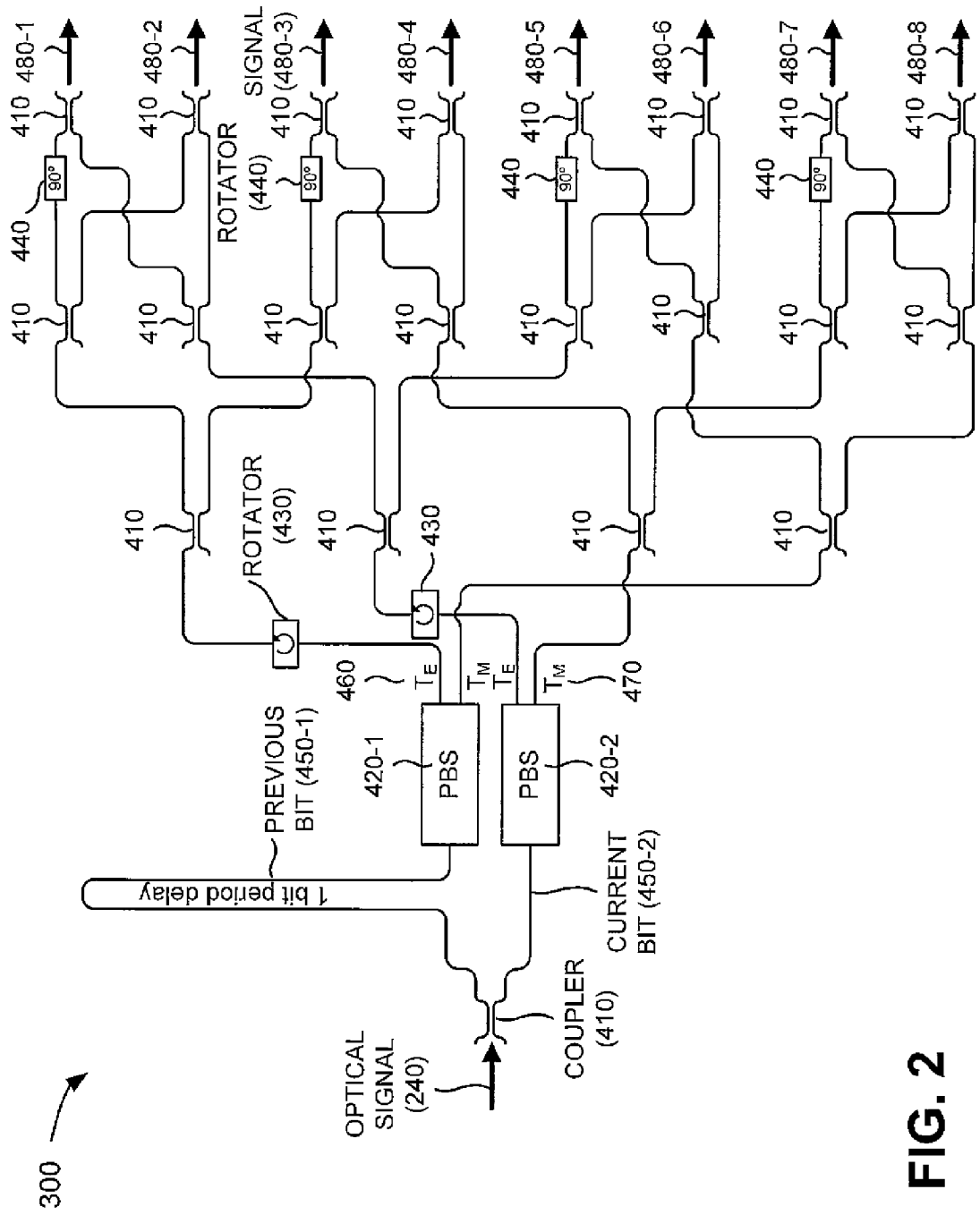
FIG. 2 illustrates a diagram of an optical processor of the optical receiver illustrated in FIG. 1.

FIG. 2 illustrates the exemplary components of optical processor 300. As shown in FIG. 2, an optical signal 240 corresponding to one of the plurality of channels of the WDM optical input signal is received at a coupler 410. Coupler 410 splits the optical input signal 240 into a current bit 450-2 a previous bit 450-1. The bit delay of the previous bit 450-1 may be realized with an interferometer. The interferometer may be implemented as a waveguide having a length that corresponds to a one-bit period delay of the optical signal 240. In other implementations, the bit-delay interferometer may be provided before an optical waveguide that connects the DEMUX 130 to the optical processor 300.

The previous bit 450-1 and the current bit 450-2 are respectively received at a first polarization splitter (PBS) 420-1 and a second PBS 420-2 (collectively referred to as "polarization beam splitters 420" and singularly as "polarization beam splitter 420"). Each polarization beam splitter 420 may include an optical device that splits a received optical signal into two optical signals of differing polarizations. In one implementation, for example, polarization beam splitter 420-1 may receive previous bit optical signal 450-1 and split it into two optical signals of differing polarizations (e.g., a first transverse electrical ($T_E$) optical signal 460 and a first transverse magnetic ($T_M$) optical signal 470). Similarly, polarization beam splitter 420-2 may receive current bit optical signal 450-2 split it into two optical signals of differing polarizations (e.g., a second transverse electrical optical signal 460 and a second transverse magnetic optical signal 470).

Optical processor 300 may include multiple couplers 410, polarization rotators 430, and optical phase shifters 440 that function to demodulate the DQPSK channel (e.g., optical signal 240) into a plurality of demodulated signal components 480-1 to 480-8. Note that although eight signal components are illustrated, optical processor 300 may be configured to provide fewer or more signal components. Each of the couplers 410 may include an optical device configured to split optical signals into multiple paths or combine multiple optical signals into a single path. In one implementation, for example, each coupler 410 may include an optical splitter (e.g., an optical device that splits an optical signal into multiple paths of optical signals), a WDM (e.g., an optical device that permits two or more different wavelengths of optical signals to be split into multiple paths or combined onto a single path), a fused fiber coupler, a coupler integrated into a PLC, or the like.

Each of the polarization rotators 430 may include an optical device that rotates a polarization plane of an optical signal (e.g., a particular number of degrees) as the optical signal passes through the device. In one implementation, each of the polarization rotators 430 may rotate a polarization plane of an optical signal ninety (90) degrees as the optical signal passes through polarization rotator 430. In one exemplary implementation, a thin polymer half-wave plate is inserted into a slot cut into a waveguide on the PLC substrate (not shown). U.S. Pat. No. 7,373,042 issued to Little and titled "Polarization Sorter" incorporated by reference herein in its entirety describes such a polarization rotator 430. Each of the optical phase shifters 440 may include an optical device that shifts the phase of an optical signal as the optical signal passes through the device. In one implementation, each of the optical phase shifters 440 may phase-shift the optical signal ninety (90) degrees as the optical signal passes through each phase shifter 440.

In operation and as further shown in FIG. 2, optical signal 240 (e.g., a channel of a DQPSK modulated signal from DEMUX 130) may be demodulated and/or demultiplexed by the arrangement of optical processor 300. Furthermore, first and second transverse electrical optical signals 460 and first and second transverse magnetic optical signals 470 may be optically split (e.g., via couplers 410), rotated (e.g., via polarization rotators 430), and/or phase shifted (e.g., via phase shifters 440) in order to produce multiple mixed optical signal pairs (e.g., signal pairs 480-1, . . . , 480-8). Optical processor 300 may provide the multiple mixed optical signal pairs (e.g., signal pairs 480-1, . . . , 480-8) to optical detector array 310 for further processing.

Although FIG. 2 shows exemplary components of optical processor 300, in other implementations, optical processor 300 may contain fewer, different, or additional components than depicted in FIG. 2. One or more components of optical processor 300 may perform one or more other tasks described as being performed by one or more other components of optical processor 300. The components of optical processor 300, as well as DEMUX 130, tunable filter 110, and VOA 120 are provided on a single substrate 620. Examples of materials for the substrate include, but are not limited to, silicon, a glass-based material, or the like. Combining the DEMUX 130, filter 110, and optical processor 300 (e.g., the passive components) on a single substrate advantageously reduces the manufacturing cost associated with the optical receiver. Additionally, the forming the passive components on a single substrate reduces signal loss due to the aligning of passive components disposed on multiple substrates as required in conventional optical receivers.

Figure 3:
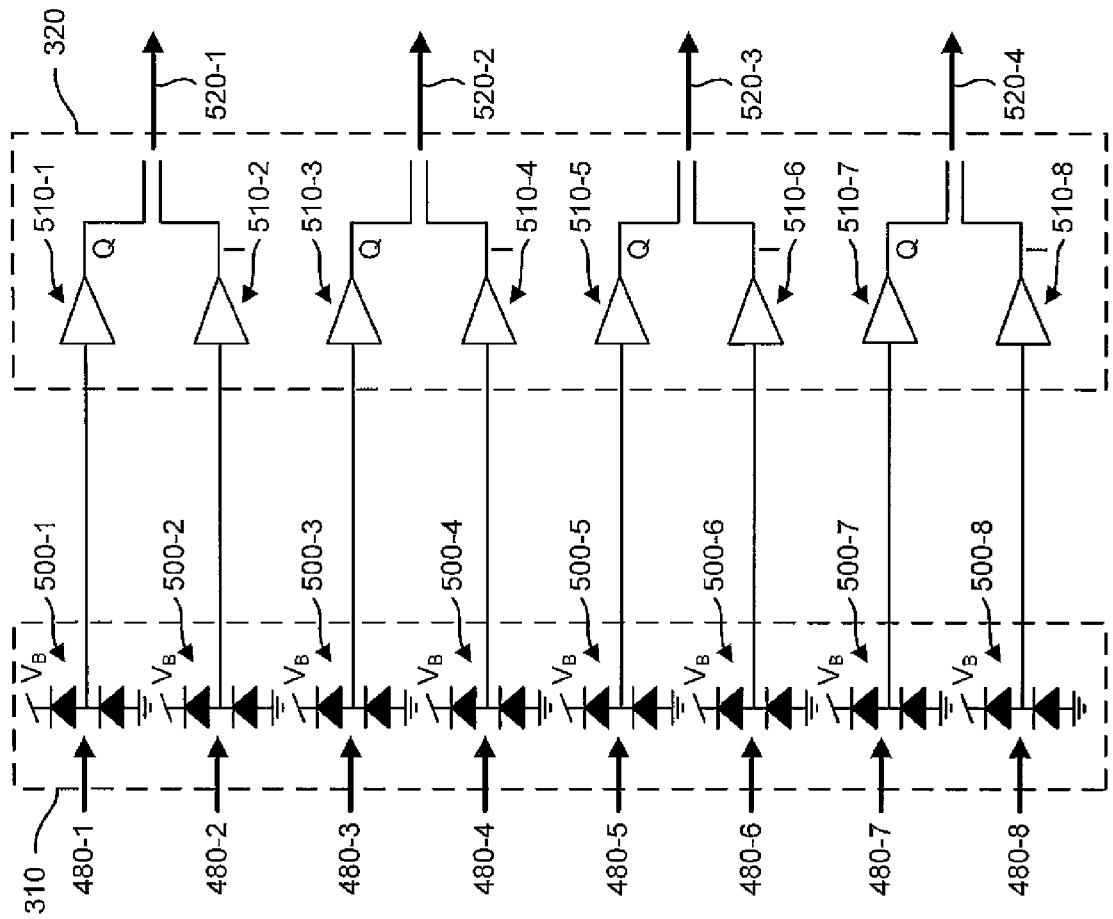
FIG. 3 illustrates a diagram of exemplary components of an optical detector array and a differential amplifier array of the optical receiver illustrated in FIG. 1.

FIG. 3 depicts a diagram of exemplary components of the optical detector array 310 and the differential transimpedance amplifier array 320 as well as the interrelationship among these exemplary components that are formed on a second substrate 610. As illustrated in FIG. 3, optical detector array 310 may include an array of one or more optical detector pairs 500-1, . . . , 500-8 (collectively referred to as "optical detector pairs 500" and singularly as "optical detector pair 500"). A differential transimpedance amplifier array 320 may be in signal communication with the optical detector pairs 500 and may include an array of one or more differential transimpedance amplifiers 510-1, . . . , 510-8 (collectively referred to as "differential amplifiers 510" and singularly as "differential amplifier 510").

Optical detector pair 500 may include a pair of optical detectors configured to convert one or more optical signals into one or more electrical signals. The optical detector pairs may convert the optical signals into electrical signals by generating an electrical voltage or current proportional to an intensity of incident optical radiation. In one exemplary embodiment, each optical detector of optical detector pair 500 may include a photodiode, such as a semiconductor positive-intrinsic-negative (PIN) photodiode, an avalanche photodiode (APD), or the like. In one implementation, optical detector pair 500 may receive a corresponding one of mixed optical signal pairs (e.g., a corresponding one of signal pairs 480-1, . . . , 480-8) from the first waveguide array 140 disposed on the first substrate 610, convert the corresponding mixed optical signal pair into a mixed electrical signal pair, and provide the mixed electrical signal pair to a corresponding one of differential amplifiers 510 (e.g., of differential transimpedance amplifier array 320). For example, optical detector pair 500-1 may receive signal pair 480-1 (e.g., from optical processor 300 by way of first waveguide array 140), convert signal pair 480-1 into a mixed electrical signal pair, and provide the mixed electrical signal pair to differential amplifier 510-1.

Differential amplifier 510 may include a device that may receive mixed electrical signals from a corresponding optical detector pair 500 (e.g., provided by optical detector array 310) and multiply a difference between the two inputs (e.g., mixed electrical signals) by a constant factor (e.g., a differential gain). Differential amplifier may output a signal (e.g., an in-phase (I) signal or a quadrature-phase (Q) signal) based on the received mixed electrical signals. For example, differential amplifier 510-1 may receive a mixed electrical signal pair from optical detector pair 500-1 and output a quadrature-phase (Q) signal based on the received mixed electrical signal pair. Differential amplifier 510-2 may receive a mixed electrical signal pair from optical detector pair 500-2 and output an in-phase (I) signal based on the received mixed electrical signal pair.

The two electrical signals can be described as carrying the quadrature-phase (Q) signal and the in-phase (I) components of the complex value of the change in optical phase between two sequential bits. The resulting signal may be combined (e.g., via an optical coupler) to produce a complex signal 520-1 (e.g., a mixed electrical signal pair) for output to a signal processor (not shown). Similarly, differential amplifiers 510-3 and 510-4 may produce a complex signal 520-2, differential amplifiers 510-5 and 510-6 may produce a complex signal 520-3, and differential amplifiers 510-7 and 510-8 may produce a complex signal 520-4 for output to a signal processor (not shown).

Although FIG. 3 shows exemplary components of optical detector array 310 and differential transimpedance amplifier array 320, in other implementations, optical detector array 310 and/or differential transimpedance amplifier array 320 may contain fewer, different, or additional components than depicted in FIG. 3. In still other implementations, one or more components of optical detector array 310 and/or differential transimpedance amplifier array 320 may perform one or more other tasks described as being performed by one or more other components of optical detector array 310 and/or differential transimpedance amplifier array 320. In still other implementations, differential transimpedance amplifier array 320 may be replaced with single-ended transimpedance amplifiers if a current sum were performed at optical detector array 320 instead of at differential transimpedance amplifier array 320.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A planar lightwave circuit (PLC), comprising:
   a substrate;
   a demultiplexer disposed on the first substrate, the demultiplexer having an input and a plurality of outputs, the input configured to receive a wavelength division multiplexed (WDM) optical input signal having a plurality of channels, each of said plurality of channels corresponding to one of a plurality of wavelengths, each of the plurality of outputs configured to supply a corresponding one of said plurality of channels;
   a plurality of tunable filters disposed on the first substrate, each of the tunable filters coupled to a respective one of the plurality of outputs of the demultiplexer, such that a plurality of filtered channels are output from the tunable filters; and
   an optical processor disposed on the substrate and communicating with at least one of the plurality of tunable filters, the optical processor configured to receive one of the plurality of filtered channels and output a set of demodulated optical signal components,
   wherein the set of optical signal components is a first set of optical signal components, and the optical processor includes:
   a plurality of beam splitters configured to split each of the plurality of filtered channels into a second set of optical signal components; and a plurality of phase shifters and polarization rotators connected to the plurality of beam splitters, the phase shifters and polarization rotators configured to adjust a phase and a polarization of each of said second set of optical signal components and output said first set of optical signal components.

2. The PLC of claim 1, further comprising a plurality of variable optical attenuators (VOAs) disposed on the substrate, each of the plurality of VOAs disposed between a corresponding one of the plurality of tunable filters and the optical processor, each of the plurality of VOAs configured to vary an intensity of a corresponding one of the plurality of filtered optical channels received from the tunable filter.

3. The PLC of claim 2, wherein the plurality of VOAs is a plurality of first VOAs, the PLC further comprising a second variable optical attenuator (VOA) disposed on the substrate and connected to the input of the demultiplexer, the second VOA configured to vary an intensity associated with the WDM optical input signal.

4. The PLC of claim 1, wherein each of the plurality of tunable filters includes at least one ring resonator.

5. The PLC of claim 1, wherein the plurality of optical channels are modulated in accordance with a Differential Quadrature Phase-Shift Keyed (DQPSK) format.

6. The PLC of claim 1, wherein each of the plurality of tunable filters has a pass-band between approximately one-half to approximately two times an optical signal bandwidth of the WDM optical input signal.

7. A planar lightwave circuit (PLC), comprising:
a substrate;
a tunable filter disposed on the substrate, the tunable filter configured to receive a wavelength division multiplexed (WDM) optical input signal having a plurality of channels, each of said plurality of channels corresponding to one of a plurality of wavelengths, said filter configured to filter at least one of a bandwidth or a particular one of said plurality of wavelengths;
a demultiplexer disposed on the first substrate, the demultiplexer having an input and a plurality of outputs, the input configured to receive the filtered WDM signal channels, each of said plurality of outputs configured to supply a corresponding one of said plurality of channels; and
an optical processor including a bit-delay interferometer communicating with a respective one of said plurality of demultiplexer outputs, the optical processor disposed on the substrate and configured to receive one of said plurality of channels and output a plurality of demodulated optical signal components,
wherein said plurality of demodulated optical signal components is a first set of a plurality of optical signal components, the optical processor includes:
a plurality of beam splitters configured to split said one of said plurality of channels received from said one of said plurality of demultiplexer outputs into a second set of a plurality of optical signal components; and
a plurality of phase shifters and polarization rotators connected to the plurality of beam splitters, the phase shifters and polarization rotators configured to adjust a phase and a polarization of each of said second set of a plurality of optical signal components and output said first set of a plurality of optical signal components.

8. The PLC of claim 7, wherein the tunable filter is a comb filter connected to the input of the demultiplexer.

9. The PLC of claim 7, further comprising a plurality of variable optical attenuators (VOAs), each of the VOAs disposed between a respective one of the plurality of demultiplexer outputs and the optical processor, each of the VOAs configured to vary an intensity of an optical channel received from the one of the plurality of demultiplexer outputs.

10. The PLC of claim 7, further comprising a variable optical attenuator (VOA) connected between an output of the tunable filter and the input of the demultiplexer, the VOA configured to vary an intensity of the filtered WDM input signal received from the tunable filter.

11. The PLC of claim 7, wherein the tunable filter includes at least one ring resonator.

12. The PLC of claim 7, wherein the WDM optical input signal is a Differential Quadrature Phase-Shift Keyed (DQPSK) signal.

13. The PLC of claim 7, wherein the tunable filter has a pass-band between approximately one-half to approximately two times an optical signal bandwidth.

* * * * *